United States Patent
Ma et al.

(10) Patent No.: US 12,101,216 B2
(45) Date of Patent: Sep. 24, 2024

(54) DATA SENDING METHOD AND APPARATUS, DATA RECEIVING METHOD AND APPARATUS, DATA TRANSMISSION SYSTEM, AND STORAGE MEDIUM

(71) Applicant: ZTE CORPORATION, Shenzhen (CN)

(72) Inventors: Yihua Ma, Shenzhen (CN); Zhifeng Yuan, Shenzhen (CN); Yuzhou Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 432 days.

(21) Appl. No.: 17/440,866

(22) PCT Filed: Feb. 13, 2020

(86) PCT No.: PCT/CN2020/075054
§ 371 (c)(1),
(2) Date: Sep. 20, 2021

(87) PCT Pub. No.: WO2020/186944
PCT Pub. Date: Sep. 24, 2020

(65) Prior Publication Data
US 2022/0166658 A1    May 26, 2022

(30) Foreign Application Priority Data
Mar. 20, 2019   (CN) .......................... 201910214524.3

(51) Int. Cl.
*H04L 27/26* (2006.01)

(52) U.S. Cl.
CPC .... *H04L 27/26526* (2021.01); *H04L 27/2607* (2013.01); *H04L 27/2628* (2013.01); *H04L 27/2636* (2013.01); *H04L 27/265* (2013.01)

(58) Field of Classification Search
CPC .......... H04L 27/26526; H04L 27/2607; H04L 27/2628; H04L 27/2636; H04L 27/265
See application file for complete search history.

(56) References Cited

U.S. PATENT DOCUMENTS

2018/0048379 A1*  2/2018  Yanagisawa ....... H04B 7/15542

FOREIGN PATENT DOCUMENTS

| CN | 1463083 A | 12/2003 |
|---|---|---|
| CN | 101267416 A | 9/2008 |

(Continued)

OTHER PUBLICATIONS

Kumar Prashant, et al. "Performance evaluation of modified OFDM for underwater communications", 2013 IEEE International Conference on Communications Workshops (ICC), IEEE, Jun. 9, 2013, pp. 967-971.

(Continued)

*Primary Examiner* — Duc C Ho
(74) *Attorney, Agent, or Firm* — BOND, SCHOENECK & KING, PLLC; George R. McGuire

(57) ABSTRACT

Provided are a data sending method and apparatus, a data receiving method and apparatus, a data transmission system, and a storage medium. The data sending method includes: a first data stream is acquired, where the first data stream includes multiple coded data symbols; an N-dimensional orthogonal transformation is performed on the first data stream to obtain an orthogonally transformed first data stream, where N≥2; a modulation processing is performed on the orthogonally transformed first data stream to obtain a first radio frequency signal; and the first radio frequency signal is sent.

20 Claims, 11 Drawing Sheets

(56) References Cited

FOREIGN PATENT DOCUMENTS

| CN | 101729134 A | 6/2010 |
|---|---|---|
| CN | 103001904 A | 3/2013 |
| CN | 107343321 A | 11/2017 |
| WO | 2009004735 A1 | 1/2009 |

OTHER PUBLICATIONS

Vishvaksenan K S et al. "Performance of MIMO MC-CDMA system for DWT technique based colour image transmission over correlated frequency-selective channel", 2014 International Conference on Communication and Signal Processing, IEEE, Apr. 3, 2014, pp. 528-532.
European search report—EP 20 77 4674, pp. 1-7. Dated Nov. 21, 2022.
International Search Report and Written Opinion, for PCT/CN2020/075054, mailing date of search report, May 8, 2020.
"Using Geolocation for the Strategic Preincident Preparation of an IT Forensics Analysis" Koch, et al., IEEE Systems Journal, vol. 10, No. 4, Dec. 2016. pp. 1338-1349.
"Image Transmission in Multi Carrier Cdma System With Different Equalization Techniques" Chachu, et al 2019 International Conference on Recent Advances in Energy-efficient Computing and Communication (ICRAECC), IEEE, Mar. 8, 2019.
"Performance Evaluation of Modified OFDM for Underwater Communications" Kumar, et al, 2013 IEEE International Conference on Communications Workshops (ICC), IEEE Jun. 13, 2013.
Singapore Search Report, dated Mar. 10, 2023 pp. 1-10.

\* cited by examiner

DATA SENDING METHOD AND APPARATUS, DATA RECEIVING METHOD AND APPARATUS, DATA TRANSMISSION SYSTEM, AND STORAGE MEDIUM

CROSS REFERENCE TO RELATED APPLICATIONS

This is a National Stage Application filed under 35 U.S.C. 371 based on International Patent Application No. PCT/CN2020/075054, filed on Feb. 13, 2020, which claims priority to Chinese Patent Application No. 201910214524.3 filed on Mar. 20, 2019, the disclosures of both of which are incorporated herein by reference in their entireties.

TECHNICAL FIELD

The present application relates to wireless communication networks, and for example, to a data sending method and apparatus, a data receiving method and apparatus, a data transmission system, and a storage medium.

BACKGROUND

Single-carrier frequency-division multiple access (SC-FDMA) is the mainstream multiple access technology of the uplink, and the SC-FDMA adds a discrete Fourier transformation (DFT) during processing at a sending terminal once compared to a traditional orthogonal frequency division multiplexing (OFDM) technology. Due to a fact that the DFT is added, a peak/average power ratio (peak-to-average ratio for short) of the sending terminal is relatively low, the transmitting efficiency of a mobile terminal may be improved, a coverage range is increased or the service time of a battery is prolonged, and the cost of the terminal is reduced.

However, compared to the traditional OFDM, the SC-FDMA performs one more DFT at the sending terminal, so that a converted modulation symbol has no regular constellation diagram on a complex plane, a receiving terminal cannot parse enough information from a modulation symbol so as to realize the signal receiving, which results in the difficulty of applying the SC-FDMA technology to a communication system that relies only on a data symbol for channel estimation and does not rely on a reference signal or a pilot signal for channel estimation.

SUMMARY

The present application provides a data sending method and apparatus, a data receiving method and apparatus, a data transmission system and a storage medium, which can improve the power transmission efficiency, increase the coverage area, reduce the power consumption and reduce the cost on the basis of only relying on a data symbol for the channel estimation.

An embodiment of the present application provides a data sending method. The method includes described below. A first data stream is acquired, where the first data stream includes multiple coded data symbols; an N-dimensional orthogonal transformation is performed on the first data stream to obtain an orthogonally transformed first data stream, where $N \geq 2$; a modulation processing is performed on the orthogonally transformed first data stream to obtain a first radio frequency signal; and the first radio frequency signal is sent.

An embodiment of the present application provides a data receiving method. The method includes described below. A first radio frequency signal is received, where the first radio frequency signal includes multiple data symbols subjected to an N-dimensional orthogonal transformation, and $N \geq 2$; a demodulation is performed on the first radio frequency signal to obtain a demodulated first data stream; an N-dimensional inverse orthogonal transformation is performed on the demodulated first data stream to obtain an inverse orthogonally transformed first data stream; and the inverse orthogonally transformed first data stream is detected to obtain a first data stream.

An embodiment of the present application provides a data sending apparatus. The data sending apparatus includes a data acquisition module, an orthogonal transformation module, a signal modulation module and a signal sending module. The data acquisition module is configured to acquire a first data stream, where the first data stream includes multiple encoded data symbols. The orthogonal transformation module is configured to perform an N-dimensional orthogonal transformation on the first data stream to obtain an orthogonally transformed first data stream, where $N \geq 2$. The signal modulation module is configured to perform a modulation processing on the orthogonally transformed first data stream to obtain a first radio frequency signal. The signal sending module is configured to send the first radio frequency signal.

An embodiment of the present application provides a data receiving apparatus. The data receiving apparatus includes a signal receiving module, a signal demodulation module, an orthogonal inverse transformation module and a data acquisition module. The signal receiving module is configured to receive a first radio frequency signal, where the first radio frequency signal includes multiple data symbols subjected to an N-dimensional orthogonal transformation, and $N \geq 2$. The signal demodulation module is configured to perform a demodulation on the first radio frequency signal to obtain a demodulated first data stream. The orthogonal inverse transformation module is configured to perform an N-dimensional inverse orthogonal transformation on the demodulated first data stream to obtain an inverse orthogonally transformed first data stream. The data acquisition module is configured to detect the inverse orthogonally transformed first data stream to obtain a first data stream.

An embodiment of the present application provides a data transmission system. The data transmission system includes a data sending terminal and a data receiving terminal. The data sending terminal includes any one of the data sending apparatuses in the embodiments of the present application. The data receiving terminal includes any one of the data receiving apparatuses in the embodiments of the present application.

An embodiment of the present application provides a storage medium. The storage medium stores a computer program, where the computer program, when executed by a processor, implements any one of the data sending methods in the embodiments of the present application.

An embodiment of the present application provides a storage medium. The storage medium stores a computer program, where the computer program, when executed by a processor, implements any one of the data receiving methods in the embodiments of the present application.

DETAILED DESCRIPTION

Embodiments of the present application will now be described in detail with reference to the accompanying drawings.

Figure 1:
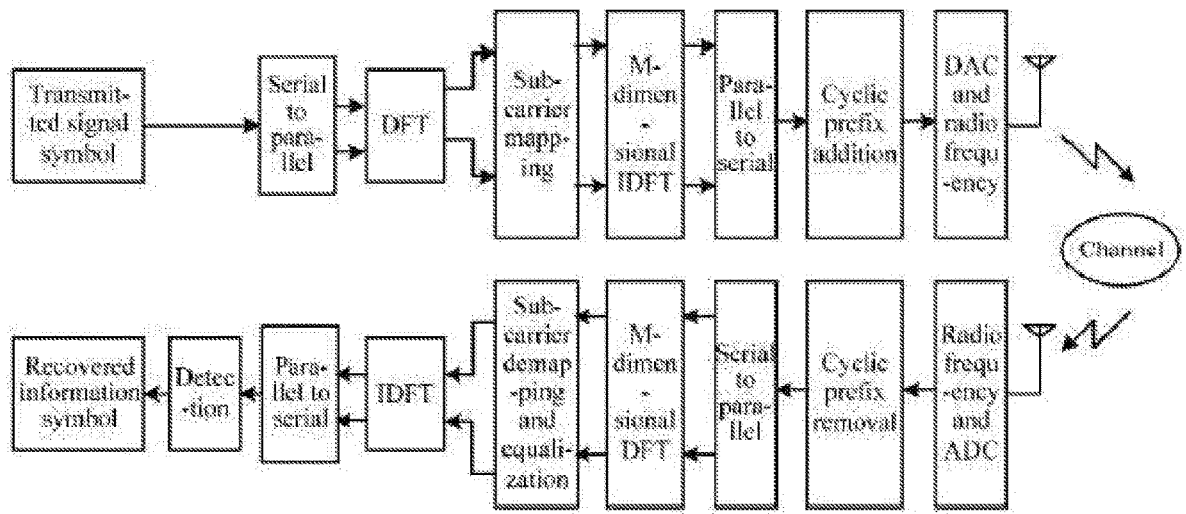
FIG. 1 is a flowchart of a signal processing of a wireless communication system adopting SC-FDMA technology provided in an embodiment.

SC-FDMA is a kind of multiple access technology used for an uplink on the basis of an OFDM, the SC-FDMA has increased a DFT at a sending terminal once compared to a traditional OFDM system, so that a transmitted signal have a single carrier characteristic, thus a peak-to-average ratio of a transmitted power may be reduced, whereby the transmitting efficiency is improved. As shown in FIG. 1, FIG. 1 is a flowchart of a signal processing of a wireless communication system adopting SC-FDMA technology provided in an embodiment. In FIG. 1, a data stream to be sent at the sending terminal is transmitted serially, and after a serial-to-parallel conversion, a DFT processing is performed firstly, and then a subcarrier mapping, an M-dimensional inverse discrete Fourier transformation (IDFT) processing, and a parallel-to-serial conversion are performed in sequence, and then the data stream is converted into a serial data stream again, and then a cyclic prefix is added, and then the data stream enters a radio frequency unit to perform a digital-to-analog conversion (DAC) and an up-conversion, so as to obtain a radio frequency signal that may be transmitted through an antenna and sent through a corresponding channel. After a receiving terminal receives the radio frequency signal through the antenna in a corresponding channel, the receiving terminal firstly performs a down-conversion and an analog-to-digital conversion (ADC) to obtain the serial data stream, then a cyclic prefix removal is performed, then a series-parallel conversion processing is performed, next an M-dimensional DFT, a subcarrier de-mapping and an equalization processing are performed, then corresponding to the sending terminal, and the IDFT processing is further performed again so as to convert a parallel data stream into a serial data stream again, and finally data sent by the sending terminal is obtained through a subsequent detection process.

Figure 2A:
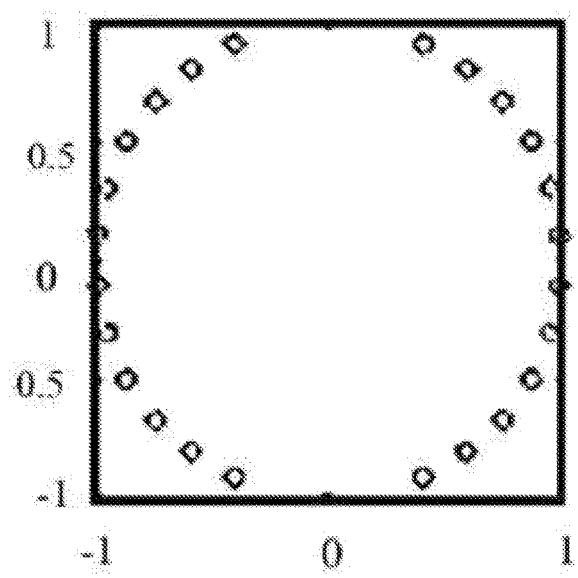
FIG. 2A is a symbol constellation diagram of an amplitude and phase modulation in an OFDM system provided in an embodiment.
Figure 2B:
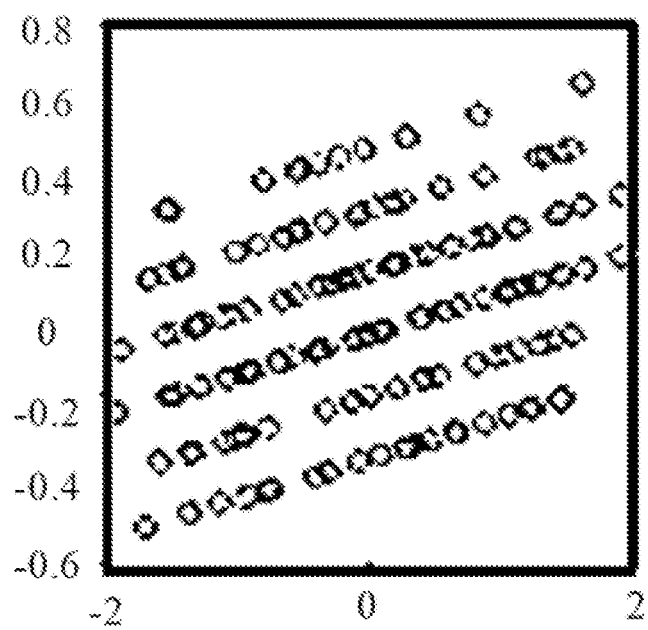
FIG. 2B is a symbol constellation diagram after a DFT processing in a DFT-based OFDM system (i.e., an SC-FDMA system) provided in an embodiment.

However, transmission symbols carried by the sending terminal in a frequency domain are digital amplitude-phase modulated symbols, such as multiple phase shift keying (MPSK) symbols or multiple quadrature amplitude modulation (MQAM) symbols. An original symbol modulated by digital amplitude and phase forms a regular constellation diagram on a complex plane, and the receiving terminal may extract the relevant characteristics of the transmitted signal from the regular constellation diagram so as to perform the channel estimation. However, in the DFT-spread-based SC-FDMA, since a modulation symbol undergoes DFT and IDFT once more, interference caused by a multipath, a time offset, and a frequency offset on the symbol in a time domain is complex convolution, and a transmission symbol carried in a frequency domain also loses the geometric characteristics of the constellation diagram, which causes difficulty in extracting useful information from the constellation diagram at the receiving terminal, and cannot use the constellation diagram to perform the channel estimation, thereby failing to correctly identify the modulation symbol. As shown in FIG. 2A and FIG. 2B, FIG. 2A is a symbol constellation diagram of an amplitude and phase modulation in an OFDM system provided in an embodiment; FIG. 2B is a symbol constellation diagram after the DFT processing in a DFT-based OFDM system (i.e., an SC-FDMA system) provided in an embodiment, from which channel-related information cannot be acquired.

The above problems make the SC-FDMA difficult to apply to a communication system that does not rely on a reference signal or a pilot signal for the channel estimation.

Figure 3:
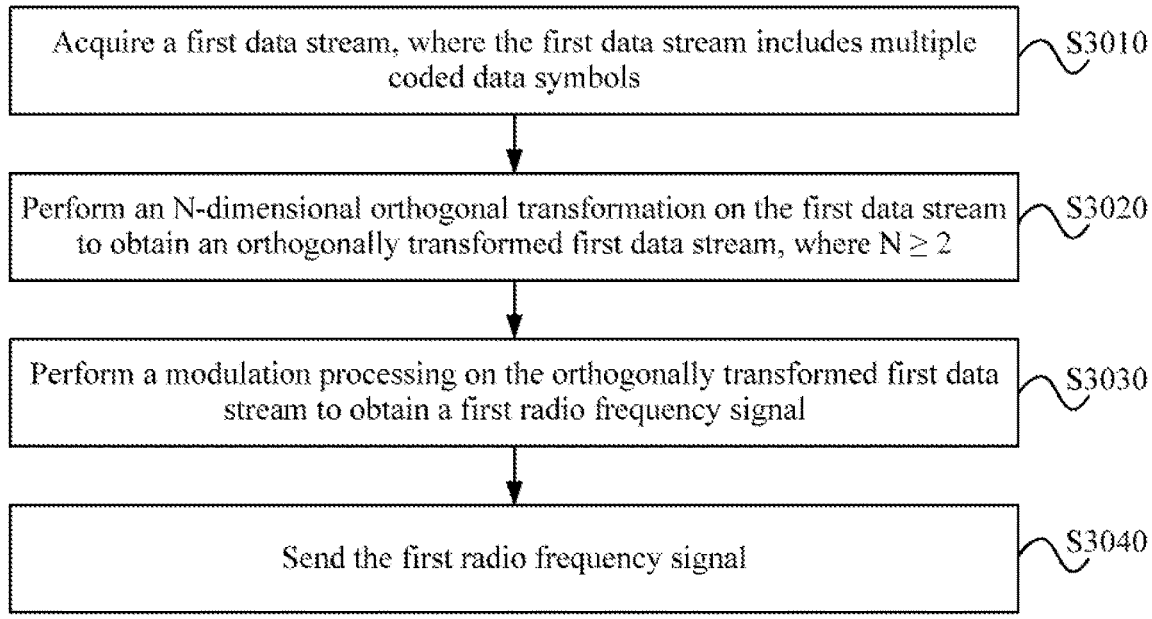
FIG. 3 is a flowchart of a data sending method provided in an embodiment.

FIG. 3 is a flowchart of a data sending method provided in an embodiment, and as shown in FIG. 3, the method provided in this embodiment includes following steps.

In step S3010, a first data stream is acquired, where the first data stream includes multiple coded data symbols.

The data sending method provided in this embodiment is applied to a data sending terminal in a wireless communication system, and the data sending terminal may be a terminal device on a user side and may also be a base station or an access point on a network side. When the sending terminal needs to send data, firstly, data to be sent needs to be coded according to a corresponding wireless communication system, and the coded data is presented as a serial data stream which is referred to as the first data stream. The first data stream includes multiple serial encoded data symbols.

In step S3020, an N-dimensional orthogonal transformation is performed on the first data stream to obtain an orthogonally transformed first data stream, where $N \geq 2$.

According to the SC-FDMA technology, before the data sending terminal performs a modulation processing on a data stream, the DFT processing is firstly performed, a DFT transform matrix is a unitary matrix, and when the dimension of the DFT is larger than 2, the DFT transform matrix is a complex unitary matrix, so that in an OFDM system applying the SC-FDMA, the complexity of data symbol feature detection after the DFT becomes high, and the channel-related information cannot be acquired through a modulated data symbol at the receiving terminal.

However, in this embodiment, the N-dimensional orthogonal transformation is performed on the first data stream, where N≥2, an orthogonal matrix used by the orthogonal transformation may be equivalently regarded as a real number unitary matrix, so that the N-dimensional orthogonal transformation of the first data stream may replace a complex number operation with a real number operation as compared to a DFT. The influence of a real number transformation on the geometric characteristics of the constellation diagram is weaker than that of a complex number transformation, so that a transformed data symbol may retain more information including symbol information and the channel-related information in the constellation diagram, and the receiving terminal may acquire related information for the channel estimation from the modulated data symbol. In addition, compared to the DFT, the N-dimensional orthogonal transformation uses the real number operation to replace the complex number operation, the hardware implementation is simpler, and the design difficulty and cost may be reduced.

Figure 2C:
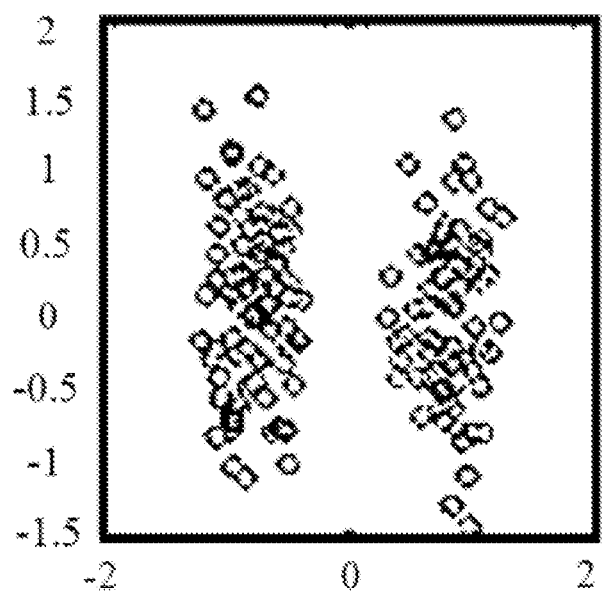
FIG. 2C is a symbol constellation diagram in an OFDM system based on an orthogonal transformation provided in an embodiment.
Figure 4:
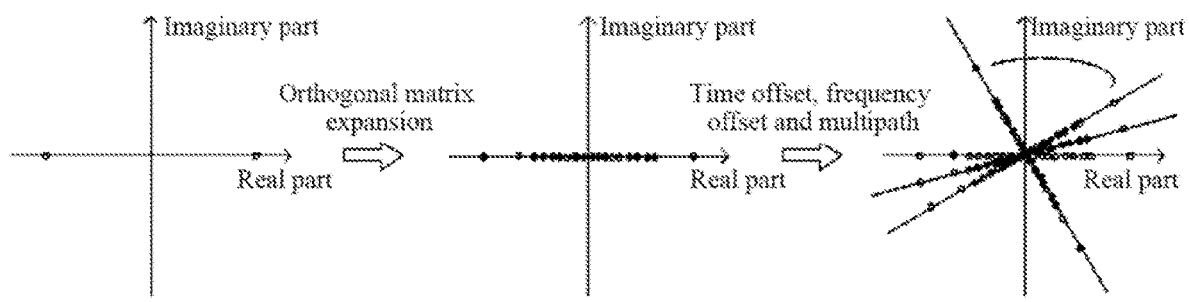
FIG. 4 is a schematic diagram of a complex plane of an N-dimensional orthogonal expansion provided in an embodiment.

After the N-dimensional orthogonal transformation, since the orthogonal transformation carries similar geometric information on a constellation diagram of symbols close to channel information, data symbols transmitted in the OFDM system may be used for estimating the time offset, the frequency offset and a multipath channel by the receiving terminal, and therefore a channel equalization may be accurately performed. A symbol transmitted in the OFDM system may further include some reference signals or pilot signals that are not used directly for the channel estimation, but rather serve an auxiliary role, e.g., to assist in the removal of phase ambiguities based on the channel estimation. In addition, in a case where the influence of a time-frequency offset and a multipath is relatively small, the orthogonal transformation may keep the constellation diagram of the modulation symbol in the OFDM system better than the DFT. As shown in FIG. 2C, FIG. 2C is a symbol constellation diagram in an OFDM system based on an orthogonal transformation provided in an embodiment, FIG. 2C preserves a shape of the constellation diagram as compared to FIG. 2B, i.e., an orthogonal transformation based OFDM system is better resistant to the time-frequency offset and the multipath interference as compared to a DFT-based OFDM system. As further shown in FIG. 4, FIG. 4 is a schematic diagram of a complex plane of an N-dimensional orthogonal expansion provided in an embodiment, data symbols on a left side in FIG. 4 are concentrated on coordinates of a binary phase shift keying (BPSK) constellation, and after the N-dimensional orthogonal transformation, the data symbols are distributed on a straight line where a connecting line of the BPSK constellation is located, as shown in the middle of FIG. 4, after the data symbols are modulated by the sending terminal and then sent, the data symbols will be shown on a right side of FIG. 4 due to the influence of the time offset, the frequency offset and the multipath. The receiving terminal may acquire parameters such as the time offset, the frequency offset and the multipath between the sending terminal and the receiving terminal according to the change of the data symbol on the complex plane shown on the right side of the FIG. 4, so that the channel estimation is performed. Furthermore, an orthogonal matrix used during orthogonal transformation may be selected to be Fourier correlation transformation of a real number type, and after the N-dimensional orthogonal transformation of this type is performed at the sending terminal, a peak-to-average power ratio of a transmitting signal may also be reduced, and the advantages of the SC-FDMA are still achieved. When an orthogonal transform matrix is some specific orthogonal matrix, such as some specific Fourier correlation transform matrix, the peak-to-average ratio of the N-dimensional orthogonal transformation-based SC-FDMA transmitting signal may be lower than that of the DFT-based SC-FDMA.

When a dimension of the orthogonal matrix is large enough or the symbol block generation time is long enough, the average energy of expanded symbols of the orthogonal matrix tends to be stable, so that the orthogonal matrix may also be used for estimating the multipath channel. In this embodiment, orthogonal matrices used by the N-dimensional orthogonal transformation are defined as all matrices Q that satisfy $Q^TQ=QQ^T=I$, and the orthogonal matrix includes, but is not limited to, a Hadamard transformation matrix, a discrete Hartley transformation matrix, and a discrete cosine transform (DCT) matrix.

The discrete cosine transform includes multiple types. A type-two DCT (DCT-II for short) has good energy compression properties, the DCT-II may be represented by following formula.

$$X_k^{DCT} = \begin{cases} \frac{1}{\sqrt{M}}\sum_{n=0}^{N-1} x_n, k = 0 \\ \sqrt{\frac{2}{M}}\sum_{n=0}^{N-1} x_n \cos\left(\frac{\pi}{2N}(2n-1)k\right), k = 1, \ldots, N-1 \end{cases}$$

The purpose of the N-dimensional orthogonal transformation is to change $x_n$ (n=0~N−1) into $X_k^{DCT}$ (k=0~N−1), where the above formula is a transform formula from $x_n$ to $X_k^{DCT}$.

The DCT may reduce the peak-to-average ratio, and the effect of reducing the peak-to-average ratio is better than that of the DFT, so that the performance of the OFDM system based on the DCT is generally based on the OFDM system of the N-dimensional orthogonal transformation.

The discrete Hartley transformation (DHT for short) is similar to the DFT, and is commonly used for changing the time-domain signal of a real number into a frequency-domain signal of a real number. The DHT may be produced by adding a real part and an imaginary part of the elements in the DFT as follows.

$$X_k^{DHT} = \frac{1}{\sqrt{N}}\sum_{n=0}^{N-1} x_n\left(\cos\frac{2\pi nk}{N} + \sin\frac{2\pi nk}{N}\right), k = 0, \ldots, N-1$$

The DHT may reduce the peak-to-average ratio of an OFDM communication system, and the effect of reducing the peak-to-average ratio is better than that of the DFT in some scenes.

Elements in the Welch Hadamard transformation (or referred to as Hadamard transformation, WHT for short) matrix only contain +1/−1, so that the complexity required for performing the Hadamard transformation is relatively low. An order N of the Hadamard matrix needs to satisfy that: N or N/12 or N/20 is a non-negative integer power of 2. A Hadamard matrix where N is the non-negative integer power of 2 may be generated iteratively as follows.

$$T_N^{WHT} = \begin{cases} 1, M = 1 \\ \frac{1}{\sqrt{2}} \begin{bmatrix} H_{N/2} & H_{N/2} \\ H_{N/2} & -H_{N/2} \end{bmatrix}, N = 2^i, i > 0 \end{cases}$$

With the transform matrix, the WHT transformation may be performed to obtain $X=T_N^{WHT} \cdot x$. Where $X=[X_0, X_1, \ldots, X_{N-1}]^T$, $x=[x_0, x_1, \ldots, x_{N-1}]^T$.

The WHT may reduce the peak-to-average ratio of the OFDM communication system, and the effect of reducing the peak-to-average ratio is better than that of the DFT in some scenes.

In step S3030, a modulation processing is performed on the orthogonally transformed first data stream to obtain a first radio frequency signal.

After the orthogonal transformation is performed on the first data stream, the modulation processing may be performed on the orthogonally transformed first data stream according to a subsequent processing flow of the OFDM system to obtain the first radio frequency signal. A process of modulation processing of the orthogonally transformed first data stream is similar to that of FIG. 1, except that the DFT is changed to the N-dimensional orthogonal transformation at the sending terminal.

A process flow of modulation processing of the orthogonally transformed first data stream is the same as the process in an OFDM system or an OFDM system based on the SC-FDMA in the related art, which includes that a subcarrier mapping, an M-dimensional IDFT, and a cyclic prefix addition are sequentially performed on the orthogonally transformed first data stream to obtain a second data stream, where M≥2; and a digital-to-analog conversion and an up-conversion are performed on the second data stream to obtain the first radio frequency signal. Since the first data stream is a data stream for serial transmission, before the N-dimensional orthogonal transformation, the subcarrier mapping and the M-dimensional IDFT are performed, serial data needs to be converted into parallel data, and after a processing is completed, the parallel data is converted into the serial data again for subsequent processing. In an embodiment, a serial first data stream is firstly converted into a parallel first data stream, then the N-dimensional orthogonal transformation is performed on the parallel first data stream to obtain a parallel and orthogonally transformed first data stream, then the subcarrier mapping and the M-dimensional IDFT are sequentially performed on the parallel and orthogonally transformed first data stream to obtain a parallel third data stream, the parallel third data stream is converted into a serial third data stream, and the cyclic prefix addition is performed on the serial third data stream to obtain the second data stream.

For example, assuming that a data symbol in the transmitted first data stream is $s_{n,1}$, then a signal after the serial-to-parallel and the N-dimensional orthogonal transformation is as follow:

$$S_k = \sum_{n=1}^{N-1} u_{k,n} s_n, n = 0, \ldots, N-1$$

where $u_{k,n}$ is an element of a k-th row and an n-th column of the orthogonal matrix U. $S_k$ becomes $S_k^{map}$ after the subcarrier mapping, and a signal after the M-dimensional IDFT is as follow.

$$x_m = \sum_{k=1}^{M-1} S_k^{map} e^{j\frac{2\pi mk}{M}}, m = 1, \ldots, M-1$$

Assuming a length of the cyclic prefix is L, then after the parallel-to-serial and the cyclic prefix addition, the signal is as follow:

$$X=[x_{M-L}, x_{M-L+1}, \ldots, x_{M-1}, x_1, x_2, \ldots, x_{M-1}]$$

Finally, the signal is transmitted out after being subjected to the DAC and the up-conversion.

In step S3040, the first radio frequency signal is sent.

After the modulation processing of the data stream is completed, a radio frequency signal, referred to as the first radio frequency signal, of a wireless communication frequency band used by the sending terminal is obtained, after the sending terminal transmits the first radio frequency signal, the data transmission process is completed, and when a receiving terminal receiving the first radio frequency signal receives the first radio frequency signal, in a case where the first radio frequency signal is demodulated and decoded, due to a fact that the N-dimensional orthogonal transformation processing is adopted for the first radio frequency signal, the receiving terminal may obtain related information from a demodulated data symbol for the channel estimation, whereby the channel estimation may be achieved without using a reference signal or a pilot signal, and thus the data receiving is completed.

In the wireless communication system, the terminal device on the user side is relatively low in transmitting power, and is sensitive to the battery endurance time and the cost, so that the data sending method provided in the embodiments of the present application is generally applied to the terminal device in the OFDM system, whereby it is possible to improve the power transmission efficiency of the mobile terminal, increase the coverage area, or prolong the service time of the battery, and reduce the cost of the terminal on the basis of only relying on the data symbol for the channel estimation. However, the data sending method provided in the embodiments of the present application is not limited to this, and when the data sending method is applied to the base station or the access point on the network side, it is still possible to improve the power transmission efficiency of the base station or the access point, increase the coverage area, reduce the power consumption, and reduce the cost on the basis of only relying on the data symbol for the channel estimation.

The data sending method provided in this embodiment includes following steps: the first data stream including the encoded data symbol is acquired; the N-dimensional orthogonal transformation is performed on the first data stream, after the modulation processing is performed on the orthogonally transformed first data stream to obtain the first radio frequency signal, the first radio frequency signal is sent, since the N-dimensional orthogonally transformed data symbol may retain more information, so that the receiving terminal may acquire related information for the channel estimation from the modulated data symbol, and therefore, the power transmission efficiency is improved, the coverage area is increased, the power consumption is reduced, and the cost is reduced on the basis of only relying on the data symbol for the channel estimation.

Figure 5:
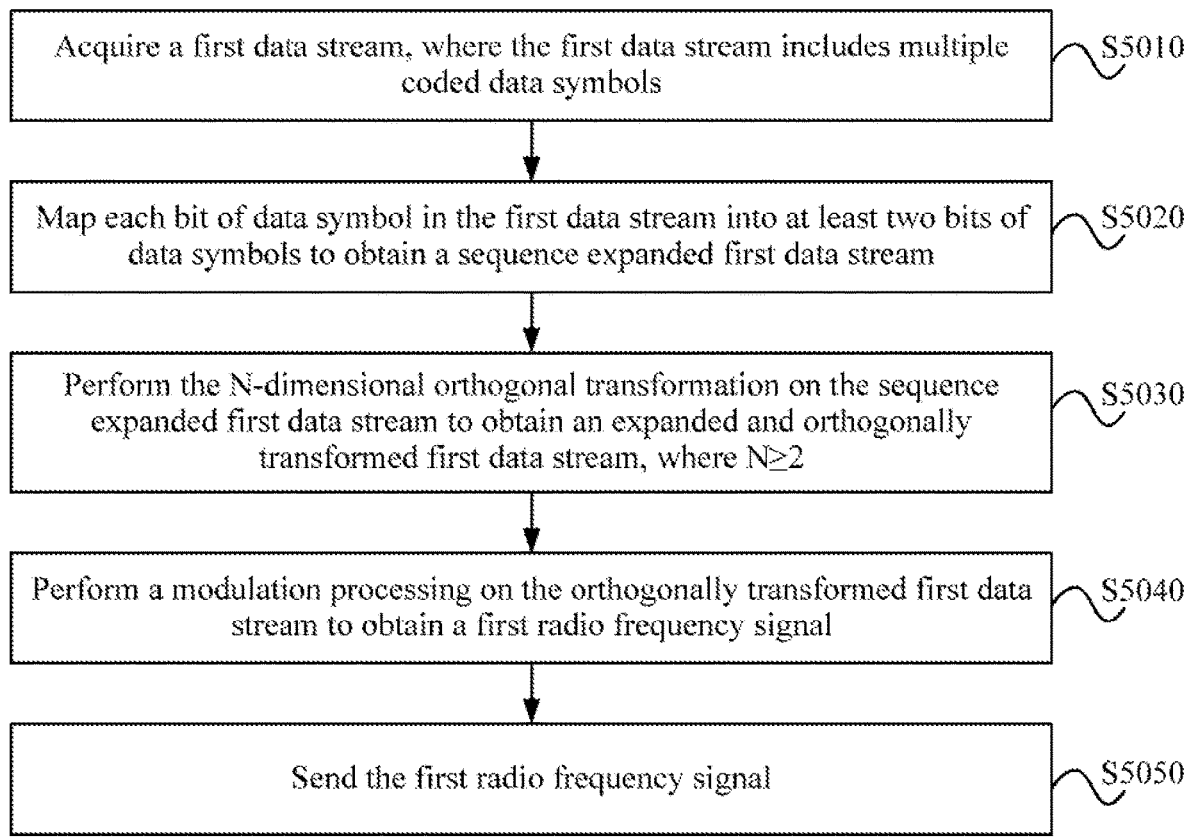
FIG. 5 is a flowchart of another data sending method provided in an embodiment.

FIG. 5 is a flowchart of another data sending method provided in an embodiment, as shown in FIG. 5, and the method provided in this embodiment includes following steps.

In step S5010, a first data stream is acquired, where the first data stream includes multiple coded data symbols.

In step S5020, each bit of data symbol in the first data stream is mapped into at least two bits of data symbols to obtain a sequence expanded first data stream.

The data sending method provided in this embodiment further combines a sequence expansion technology on the basis of the embodiment shown in FIG. 3. After the first data stream is acquired, before an N-dimensional orthogonal transformation is performed on the first data stream, a sequence expansion processing may be firstly performed on data symbols in the first data stream. In an embodiment, the each bit of data symbol in the first data stream is mapped into the at least two bits of data symbols to obtain the sequence expanded first data stream. After the sequence expansion, signals of different users may be transmitted on the same time-frequency resource.

Figure 6:
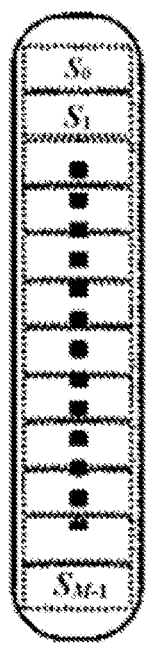
FIG. 6 is a schematic diagram of a sequence expansion provided in an embodiment.
Figure 6:
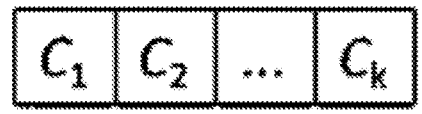
Figure 6:
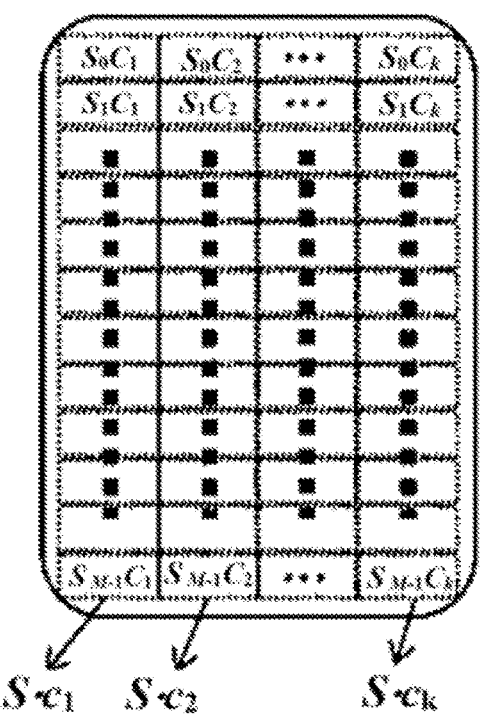

The sequence expansion may be a process of mapping 1-bit data to multiple bits simply by multiplying the data symbol by an expansion code. As shown in FIG. 6, FIG. 6 is a schematic diagram of a sequence expansion provided in an embodiment, on the left side, there is a pre-expansion data stream S, a one-bit OFDM symbol is expanded into a k-bit OFDM symbol by a k-bit long expansion sequence C, and an expanded sequence is shown on the right side.

The expansion sequence used by the first data stream may be any one expansion sequence in a preset expansion sequence group, and the each bit of data symbol in the first data stream is mapped into the at least two bits of data symbols by using the any one expansion sequence to obtain the sequence expanded first data stream. Therefore, a receiving terminal may use each of multiple expansion sequences in the preset expansion sequence group to sequentially perform a de-expanded processing on a received signal, and different user data may adopt different expansion sequences in the preset expansion sequence group, so that the mutual interference is avoided. An expansion sequence used by the receiving terminal for the de-expanded processing may be different from an expansion sequence used by the sending terminal, and an optimal expansion sequence selected during de-expanded is an expansion sequence which has good correlation with an expansion sequence used by the sending terminal during expansion and has poor correlation with expansion sequences used by other users, and the data of the user may be solved through the expansion sequence. However, in a case where the receiving terminal performs a successive interference cancellation (SIC), the expansion sequence adopted upon sending data by the sending terminal needs to be solved again according to the solved user data.

In step S5030, the N-dimensional orthogonal transformation is performed on the sequence expanded first data stream to obtain an expanded and orthogonally transformed first data stream, where N≥4.

The method of performing the N-dimensional orthogonal transformation on the expanded first data stream is similar to the step S1020 in FIG. 1. After the sequence expansion is performed, the receiving terminal may independently estimate channel information of each symbol or each group of symbols on the time-frequency resources by utilizing angle and energy information reserved by symbols after the orthogonal matrix expansion, and channel information of the time offset, the frequency offset and different subcarriers is estimated by utilizing difference of channel information on different symbols.

In step S5040, a modulation processing is performed on the orthogonally transformed first data stream to obtain a first radio frequency signal.

In step S5050, the first radio frequency signal is sent.

Figure 7:
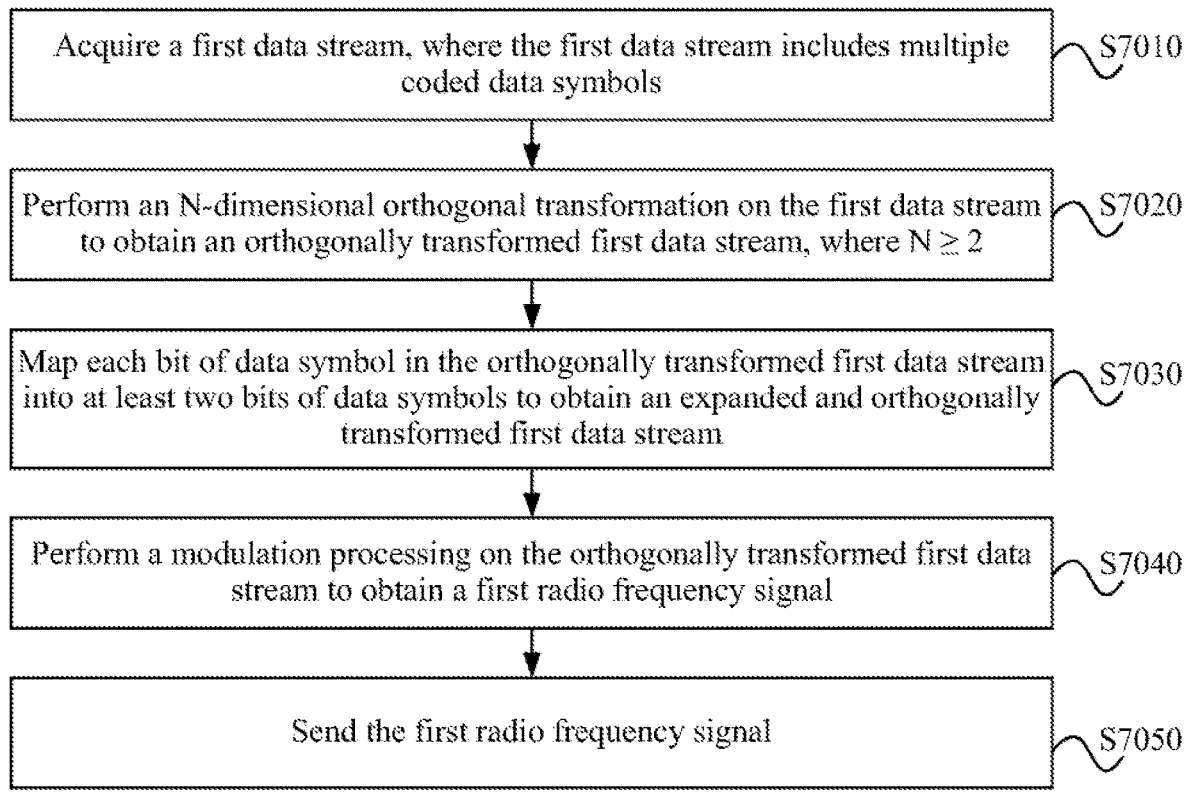
FIG. 7 is a flowchart of another data sending method provided in an embodiment.

FIG. 7 is a flowchart of another data sending method provided in an embodiment, as shown in FIG. 7, and the method provided in this embodiment includes following steps.

In step S7010, a first data stream is acquired, where the first data stream includes multiple coded data symbols.

In step S7020, an N-dimensional orthogonal transformation is performed on the first data stream to obtain an orthogonally transformed first data stream, where N≥2.

In step S7030, each bit of data symbol in the orthogonally transformed first data stream is mapped into at least two bits of data symbols to obtain an expanded and orthogonally transformed first data stream.

The embodiment shown in FIG. 7 differs from the embodiment shown in FIG. 5 in that: the first data stream is firstly subjected to a sequence expansion and then subjected to the N-dimensional orthogonal transformation in FIG. 5, whereas the first data stream is firstly subjected to the N-dimensional orthogonal transformation and then subjected to the sequence expansion in FIG. 7. FIG. 5 and FIG. 7 may achieve similar effects, and may be used according to actual needs.

In step S7040, a modulation processing is performed on the orthogonally transformed first data stream to obtain a first radio frequency signal.

In step S7050, the first radio frequency signal is sent.

Figure 8:
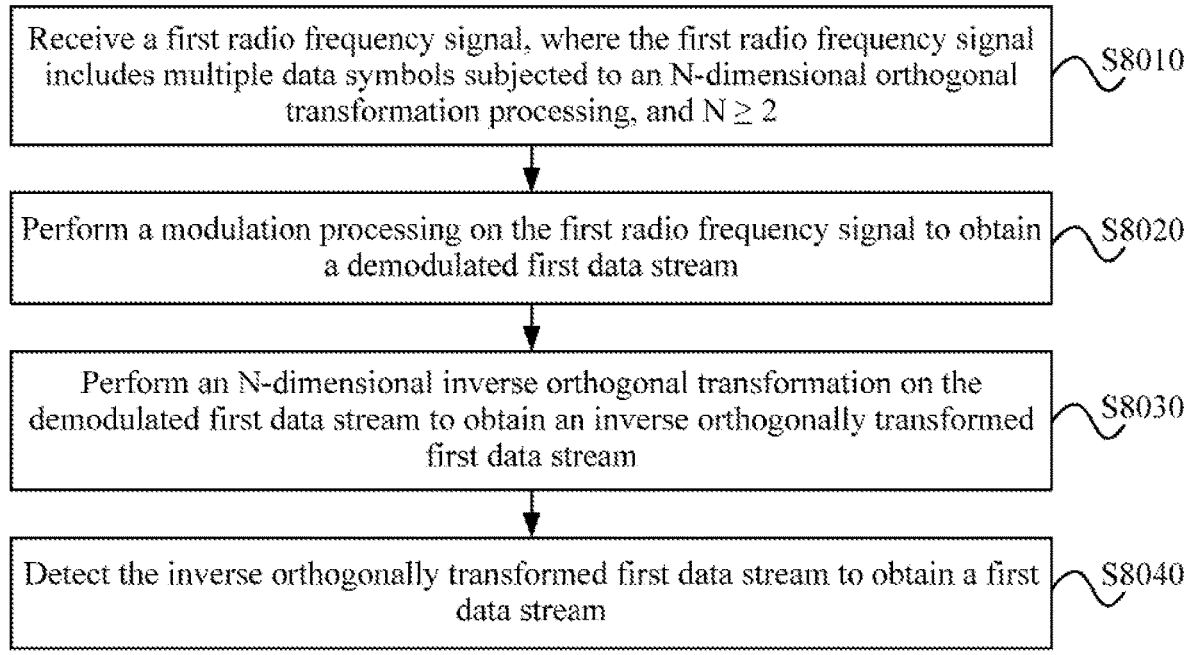
FIG. 8 is a flowchart of a data receiving method provided in an embodiment.

FIG. 8 is a flowchart of a data receiving method provided in an embodiment, as shown in FIG. 8, and the method provided in this embodiment includes following steps.

In S8010, a first radio frequency signal is received, where the first radio frequency signal includes multiple data symbols subjected to an N-dimensional orthogonal transformation processing, and N≥2.

The data receiving method provided in this embodiment is applied to a data receiving terminal in a wireless communication system, and the data receiving terminal may be a terminal device on a user side and may also be a base station or an access point on a network side. When the receiving terminal receives the radio frequency signal, the received radio frequency signal needs to be demodulated and decoded, and then required data may be obtained. In an OFDM system based on the SC-FDMA, since the sending terminal performs a DFT processing on the data symbols, the receiving terminal cannot acquire enough information from the data symbols to complete channel estimation, and therefore, in this embodiment, the data symbols contained in the first radio frequency signal received by the receiving terminal are subject to the N-dimensional orthogonal transformation processing, where N≥2. Since the N-dimensional orthogonally transformed data symbol may retain more information, including information in a constellation diagram and other related information, the receiving terminal may acquire the related information for the channel estimation from the modulated data symbol.

In S8020, a modulation processing is performed on the first radio frequency signal to obtain a demodulated first data stream.

A process of demodulating the first radio frequency signal includes a down-conversion, an analog-to-digital conversion, and other series of processing, and finally the demodulated first data stream is obtained.

In S8030, an N-dimensional inverse orthogonal transformation is performed on the demodulated first data stream to obtain an inverse orthogonally transformed first data stream.

A process of performing the N-dimensional inverse orthogonal transformation on the demodulated first data stream is an inverse process of the N-dimensional orthogonal transformation process in the embodiments shown in the FIGS. 1 to 7, and a processing process of the N-dimensional inverse orthogonal transformation may be known by those skilled in the art through the N-dimensional orthogonal transformation process in the embodiments shown in FIGS. 1 to 7.

A process of processing the first radio frequency signal may include that: the process of demodulating the first radio frequency signal includes the down-conversion, the analog-to-digital conversion, and then a cyclic prefix removal, an M-dimensional discrete Fourier transformation, a subcarrier de-mapping, and an equalization processing are sequentially performed on the demodulated first data stream to obtain a fourth data stream, where M≥2. The N-dimensional inverse orthogonal transformation is performed on the fourth data stream to obtain the inverse orthogonally transformed first data stream. Similar to the embodiment shown in FIG. 3, a conversion process of the serial data stream and the parallel data stream is also included in the receiving terminal, and the conversion process includes that: a cyclic prefix removal is performed on the demodulated first data stream to obtain a serial fifth data stream; and the serial fifth data stream is converted into a parallel fifth data stream, and the M-dimensional discrete Fourier transformation, the subcarrier de-mapping, and the equalization processing are sequentially performed on the parallel fifth data stream to obtain a parallel fourth data stream. The N-dimensional inverse orthogonal transformation is performed on the parallel fourth data stream to obtain a parallel and inverse orthogonally transformed first data stream; and the parallel and inverse orthogonally transformed first data stream is converted into a serial and inverse orthogonally transformed first data stream.

In S8040, the inverse orthogonally transformed first data stream is detected to obtain a first data stream.

After the inverse orthogonally transformed first data stream is obtained, a required detection process is performed again according to a corresponding wireless communication system, then a decoding processing is performed, actual data sent by the sending terminal to the receiving terminal may be obtained, and thus a data transmission process of the wireless communication system is achieved.

According to the data receiving method provided in this embodiment, a first radio frequency signal of data symbols subjected to the N-dimensional orthogonal transformation processing is received, the modulation processing is performed on the first radio frequency signal, the N-dimensional inverse orthogonal transformation is performed on the demodulated first data stream, after the inverse orthogonally transformed first data stream is obtained, and the inverse orthogonally transformed first data stream is detected to obtain the first data stream, since the N-dimensional orthogonally transformed data symbol may retain more information, so that the receiving terminal may acquire related information for the channel estimation from the modulated data symbol, and therefore, the power transmission efficiency is improved, the coverage area is increased, the power consumption is reduced, and the cost is reduced on the basis of only relying on the data symbol for the channel estimation.

Figure 9:
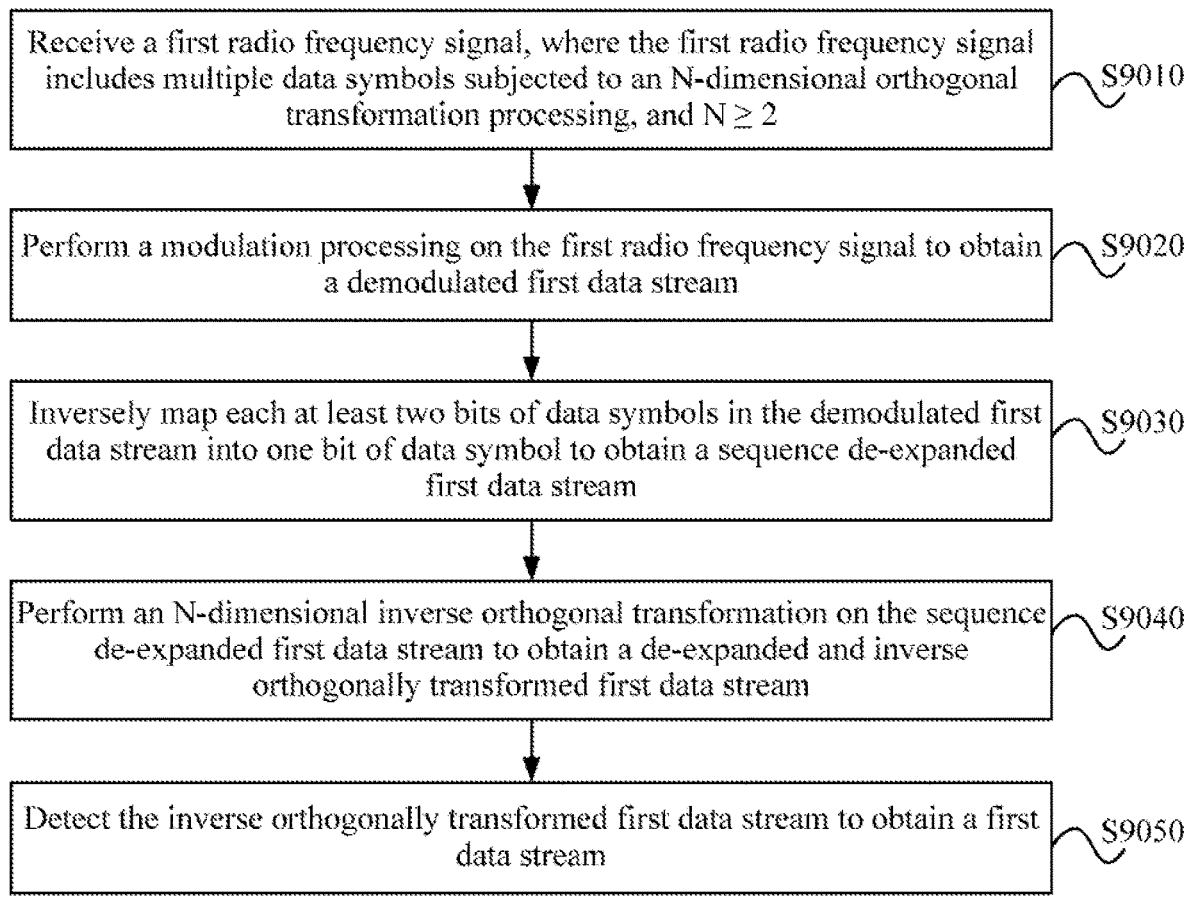
FIG. 9 is a flowchart of another data receiving method provided in an embodiment.

FIG. 9 is a flowchart of another data receiving method provided in an embodiment, as shown in FIG. 9, and the method provided in this embodiment includes following steps.

In step S9010, a first radio frequency signal is received, where the first radio frequency signal includes multiple data symbols subjected to an N-dimensional orthogonal transformation processing, and N≥2.

In step S9020, a modulation processing is performed on the first radio frequency signal to obtain a demodulated first data stream.

In step S9030, each at least two bits of data symbols in the demodulated first data stream are performed an inverse mapping into one bit of data symbol to obtain a sequence de-expanded first data stream.

In step S9040, an N-dimensional inverse orthogonal transformation is performed on the sequence de-expanded first data stream to obtain a de-expanded and inverse orthogonally transformed first data stream.

In step S9050, the inverse orthogonally transformed first data stream is detected to obtain a first data stream.

Figure 10:
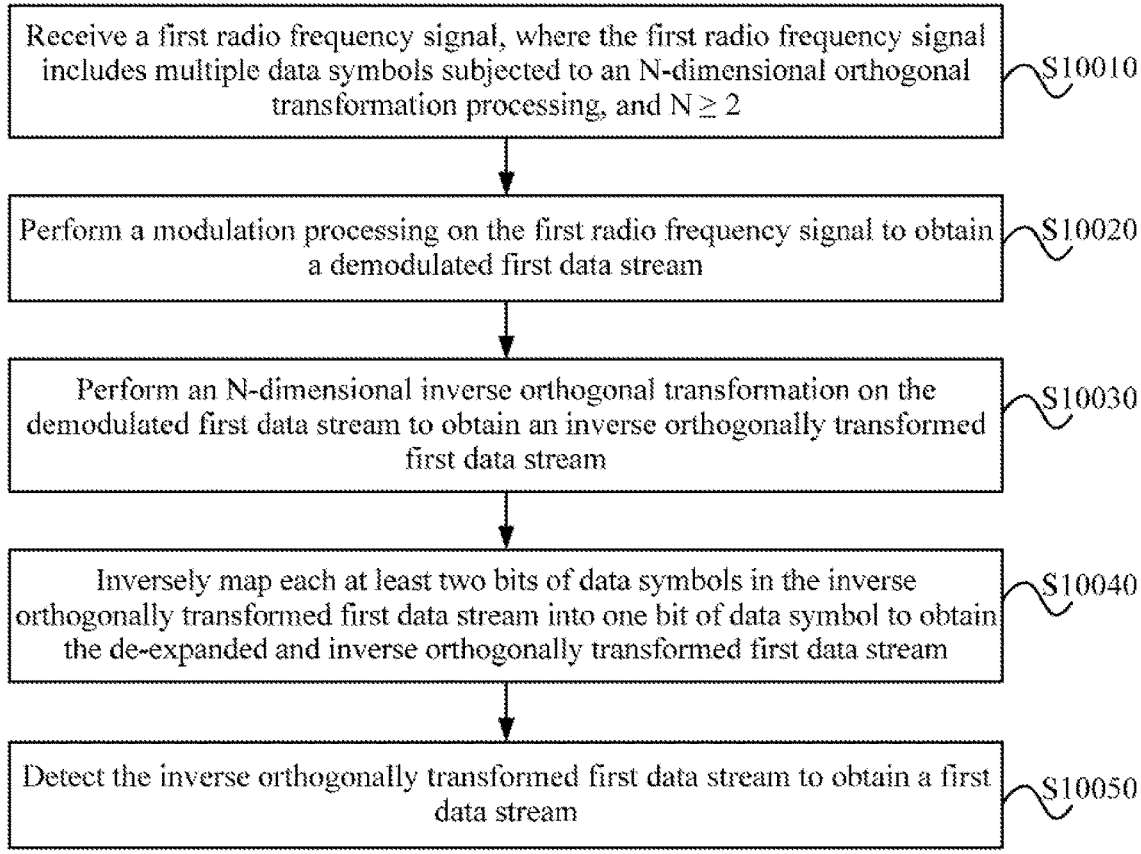
FIG. 10 is a flowchart of another data receiving method provided in an embodiment.

FIG. 10 is a flowchart of another data receiving method provided in an embodiment, as shown in FIG. 10, and the method provided in this embodiment includes following steps.

In step S10010, a first radio frequency signal is received, where the first radio frequency signal includes multiple data symbols subjected to an N-dimensional orthogonal transformation processing, and N≥2.

In step S10020, a modulation processing is performed on the first radio frequency signal to obtain a demodulated first data stream.

In step S10030, an N-dimensional inverse orthogonal transformation is performed on the demodulated first data stream to obtain an inverse orthogonally transformed first data stream.

In step S10040, each at least two bits of data symbols in the inverse orthogonally transformed first data stream are performed an inverse mapping into one bit of data symbol to obtain the de-expanded and inverse orthogonally transformed first data stream.

In step S10050, the inverse orthogonally transformed first data stream is detected to obtain a first data stream.

The embodiment shown in FIG. 9 is a processing process of the receiving terminal corresponding to the embodiment shown in FIG. 5, the embodiment shown in FIG. 10 is a processing process of the receiving terminal corresponding to the embodiment shown in FIG. 7, the embodiments shown in FIG. 9 and FIG. 10 are different from those shown in FIG. 8 only by adding the sequence de-expanded, and the embodiments shown in FIGS. 9 and 10 differ in that, in FIG. 9, the demodulated first data stream is firstly subjected to the sequence de-expanded and then subjected to the N-dimensional inverse orthogonal transformation, while in FIG. 10, the demodulated first data stream is firstly subjected to the N-dimensional inverse orthogonal transformation and then subjected to the sequence de-expanded. FIGS. 9 and 10 can achieve similar effects and may be used according to actual needs.

In an embodiment, in the embodiment shown in FIG. 9, the step S9030 includes that: each at least two bits of data symbols in the demodulated first data stream are performed an inverse mapping into one bit of data symbol in sequence by using each extension sequence in a preset extension sequence group until the sequence de-expanded first data stream is obtained, and an expansion sequence used is determined.

In an embodiment, shown in FIG. 10, the step S10040 includes that: each at least two bits of data symbols in the inverse orthogonally transformed first data stream are performed an inverse mapping into one bit of data symbol in sequence by using each extension sequence in the preset extension sequence group until the de-expanded and inverse orthogonally transformed first data stream is obtained, and an expansion sequence used is determined.

In the embodiments shown in FIGS. 8 to 10, the N-dimensional orthogonal transformation includes any one of: an N-dimensional discrete cosine transformation, an N-dimensional discrete Hartley transformation, or an N-dimensional Welch Hadamard transformation.

Figure 11:
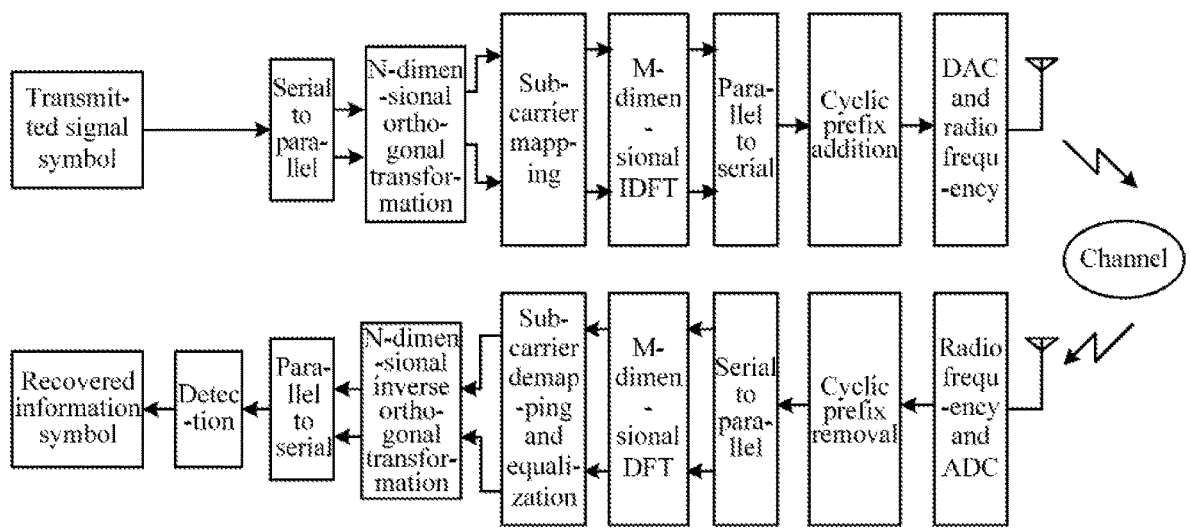
FIG. 11 is a flowchart of a signal processing of a wireless communication system based on an N-dimensional orthogonal transformation provided in an embodiment.

FIG. 11 is a flowchart of a signal processing of a wireless communication system based on an N-dimensional orthogonal transformation provided in an embodiment. Compared to a flowchart of a signal processing of a wireless communication system adopting the SC-FDMA technology shown in FIG. 1, the difference is that the DFT of the sending terminal is replaced by the N-dimensional orthogonal transformation, and the IDFT of the receiving terminal is replaced by the N-dimensional inverse orthogonal transformation. The N-dimensional inverse orthogonal transformation is an inverse transform of a corresponding N-dimensional orthogonal transformation.

Figure 12:
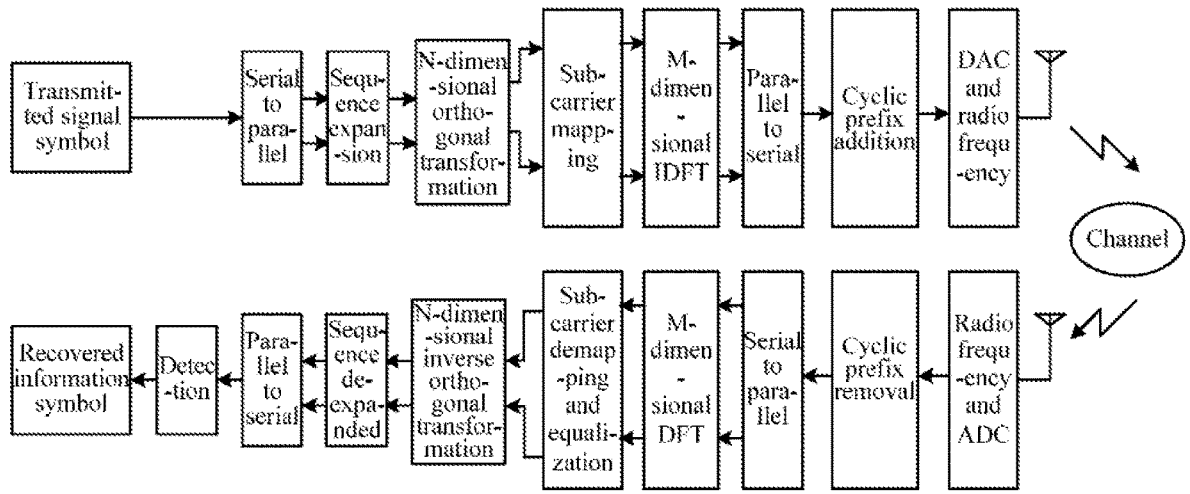
FIG. 12 is a flowchart of a signal processing of another wireless communication system based on an N-dimensional orthogonal transformation provided in an embodiment.

FIG. 12 is a flowchart of a signal processing of another wireless communication system based on an N-dimensional orthogonal transformation provided in an embodiment. FIG. 12, on the basis of FIG. 11, the sequence expansion is performed before the N-dimensional orthogonal transformation at the sending terminal, and the sequence de-expanded is performed after the N-dimensional inverse orthogonal transformation at the receiving terminal.

Figure 13:
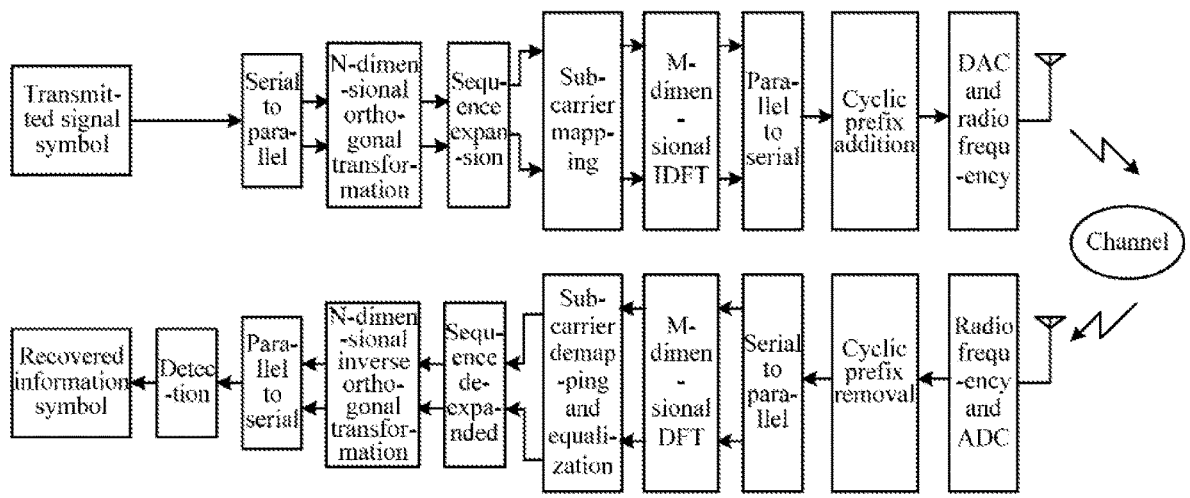
FIG. 13 is a flowchart of a signal processing of another wireless communication system based on an N-dimensional orthogonal transformation provided in an embodiment.

FIG. 13 is a flowchart of a signal processing of another wireless communication system based on an N-dimensional orthogonal transformation provided in an embodiment. FIG. 13, on the basis of FIG. 11, the sequence expansion is performed after the N-dimensional orthogonal transformation at the sending terminal, and the sequence de-expanded is performed before the N-dimensional inverse orthogonal transformation at the receiving terminal.

Figure 14:
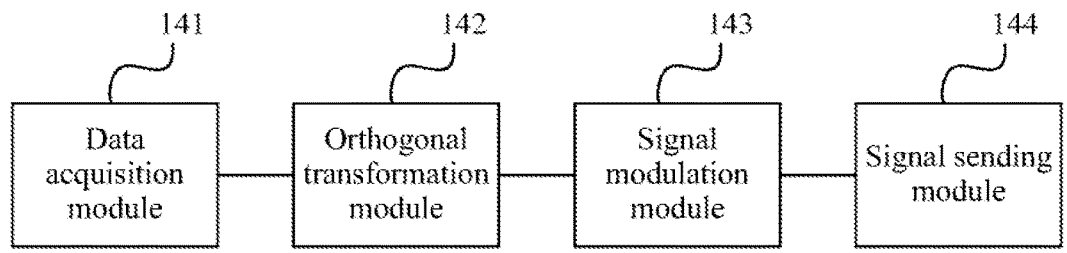
FIG. 14 is a schematic structural diagram of a data sending apparatus provided in an embodiment.

FIG. 14 is a schematic structural diagram of a data sending apparatus provided in an embodiment, as shown in FIG. 14, and the data sending apparatus provided in this embodiment includes a data acquisition module 141, an orthogonal transformation module 142, a signal modulation module 143 and a signal sending module 144. The data acquisition module 141 is configured to acquire a first data stream, where the first data stream includes multiple encoded data symbols. The orthogonal transformation module 142 is configured to perform an N-dimensional orthogonal transformation on the first data stream to obtain an orthogonally transformed first data stream, where N≥2. The signal modulation module 143 is configured to perform a modulation processing on the orthogonally transformed first data stream to obtain a first radio frequency signal. The signal sending module 144 is configured to send the first radio frequency signal.

The data sending apparatus provided in this embodiment is used for implementing the data sending method of the embodiment shown in FIG. 1, and the implementation principle and the technical effect of the data sending apparatus provided in this embodiment are similar, which is not repeated here.

In an embodiment, in the embodiment shown in FIG. 14, the orthogonal transformation module 142 is configured to map each bit of data symbol in the first data stream into at least two bits of data symbols to obtain a sequence expanded first data stream in a following manner: the each bit of data symbol in the first data stream is mapped into the at least two bits of data symbols to obtain the sequence expanded first data stream and the N-dimensional orthogonal transformation is performed on the sequence expanded first data stream to obtain an expanded and orthogonally transformed first data stream. The orthogonal transformation module 142 is configured to: map each bit of data symbol in the orthogonally transformed first data stream into at least two bits of data symbols to obtain an expanded and orthogonally transformed first data stream; and perform the N-dimensional orthogonal transformation on the first data stream to obtain an orthogonally transformed first data stream, map each bit of data symbol in the orthogonally transformed first data stream into at least two bits of data symbols to obtain an expanded and orthogonally transformed first data stream.

In an embodiment, in the embodiment shown in FIG. 14, the orthogonal transformation module 142 is configured to map each bit of data symbol in the first data stream into at least two bits of data symbols by using any one expansion sequence in a preset expansion sequence group to obtain a sequence expanded first data stream; or map each bit of data symbol in the orthogonally transformed first data stream into at least two bits of data symbols by using any one expansion sequence in a preset expansion sequence group to obtain an expanded and orthogonally transformed first data stream.

In an embodiment, in the embodiment shown in FIG. 14, the signal modulation module 143 is configured to: sequentially perform a subcarrier mapping, an M-dimensional inverse discrete Fourier transformation, and a cyclic prefix addition on the orthogonally transformed first data stream to obtain a second data stream, where M≥2; and perform a digital-to-analog conversion and an up-conversion on the second data stream to obtain the first radio frequency signal.

In an embodiment, in the embodiment shown in FIG. 14, the data sending apparatus further includes a serial-to-parallel conversion module configured to convert a serial first data stream into a parallel first data stream.

In an embodiment, in the embodiment shown in FIG. 14, the orthogonal transformation module 142 is configured to perform the N-dimensional orthogonal transformation on the parallel first data stream to obtain a parallel and orthogonally transformed first data stream; the signal modulation module 143 is configured to sequentially perform the subcarrier mapping, the M-dimensional inverse discrete Fourier transformation, and the cyclic prefix addition on the orthogonally transformed first data stream to obtain the second data stream in a following manner: the subcarrier mapping and the M-dimensional inverse discrete Fourier transformation are sequentially performed on the parallel and orthogonally transformed first data stream to obtain a parallel third data stream; a parallel third data stream is converted into a serial third data stream; and the cyclic prefix addition is performed on the serial third data stream to obtain the second data stream.

In an embodiment, in the embodiment shown in FIG. 14, the N-dimensional orthogonal transformation includes any one of: an N-dimensional discrete cosine transformation, an N-dimensional discrete Hartley transformation, or an N-dimensional Welch Hadamard transformation.

Figure 15:
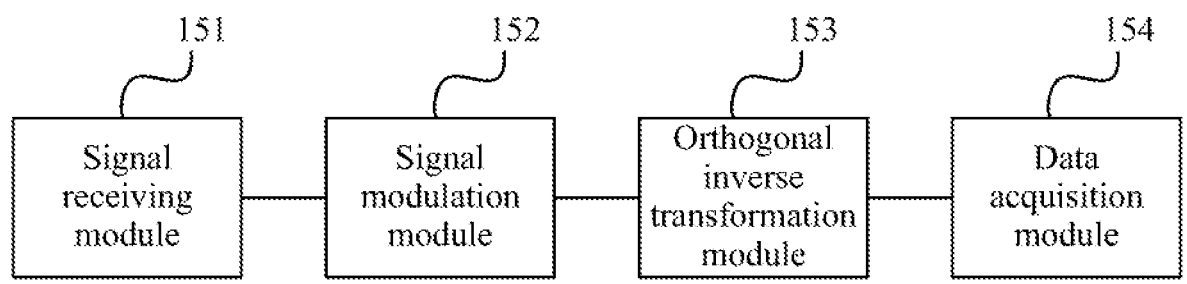
FIG. 15 is a schematic structural diagram of a data receiving apparatus provided in an embodiment.

FIG. 15 is a schematic structural diagram of a data receiving apparatus provided in an embodiment, as shown in FIG. 15, the data receiving apparatus provided in this embodiment includes a signal receiving module 151, a signal demodulation module 152, an orthogonal inverse transformation module 153 and a data acquisition module 154. The signal receiving module 151 is configured to receive a first radio frequency signal, where the first radio frequency signal includes multiple data symbols subjected to an N-dimensional orthogonal transformation processing, and N≥2. The signal demodulation module 152 is configured to perform a demodulation on the first radio frequency signal to obtain a demodulated first data stream. The orthogonal inverse transformation module 153 is configured to perform an N-dimensional inverse orthogonal transformation on the demodulated first data stream to obtain an inverse orthogonally transformed first data stream. The data acquisition module 154 is configured to detect the inverse orthogonally transformed first data stream to obtain a first data stream.

The data receiving apparatus provided in this embodiment is used for implementing the data receiving method of the embodiment shown in FIG. 8, and the implementation principle and the technical effect of the data receiving apparatus provided in this embodiment are similar, which is not repeated here.

In an embodiment, in the embodiment shown in FIG. 15, the orthogonal inverse transform module 153 is configured to: inversely map each at least two bits of data symbols in the demodulated first data stream into one bit of data symbol to obtain a sequence de-expanded first data stream, and perform the N-dimensional inverse orthogonal transformation on the sequence de-expanded first data stream to obtain a de-expanded and inverse orthogonally transformed first data stream; or, perform the N-dimensional inverse orthogonal transformation on the demodulated first data stream to obtain an inverse orthogonally transformed first data stream, and inversely map each at least two bits of data symbols in the inverse orthogonally transformed first data stream into one bit of data symbol to obtain a de-expanded and inverse orthogonally transformed first data stream.

In an embodiment, in the embodiment shown in FIG. 15, the orthogonal inverse transform module 153 is configured to perform the inverse mapping on the each at least two bits of data symbols in the demodulated first data stream into the one bit of data symbol to obtain the sequence de-expanded first data stream in a following manner: each at least two bits of data symbols in the demodulated first data stream are performed an inverse mapping into one bit of data symbol in sequence by using each extension sequence in a preset extension sequence group until the sequence de-expanded first data stream is obtained, and an expansion sequence used is determined; the orthogonal inverse transform module 153 is configured to perform the inverse mapping on the each at least two bits of data symbols in the inverse orthogonally transformed first data stream into the one bit of data symbol to obtain the de-expanded and inverse orthogonally transformed first data stream in a following manner: each at least two bits of data symbols in the inverse orthogonally transformed first data stream are performed an inverse mapping into one bit of data symbol in sequence by using each extension sequence in the preset extension sequence group until the de-expanded and inverse orthogonally transformed first data stream is obtained, and an expansion sequence used is determined.

In an embodiment, in the embodiment shown in FIG. 15, the signal demodulation module 152 is configured to: perform a down-conversion and an analog-to-digital conversion on the first radio frequency signal to obtain the demodulated first data stream; sequentially perform a cyclic prefix removal, an M-dimensional discrete Fourier transformation, a subcarrier de-mapping, and an equalization processing on the demodulated first data stream to obtain a fourth data stream, where M≥2; the orthogonal inverse transformation module 153 is configured to perform the N-dimensional inverse orthogonal transformation on the fourth data stream to obtain the inverse orthogonally transformed first data stream.

In an embodiment, in the embodiment shown in FIG. 15, the signal demodulation module 152 is configured to: sequentially perform the cyclic prefix removal, the M-dimensional discrete Fourier transformation, the subcarrier de-mapping, and the equalization processing on the demodulated first data stream to obtain the fourth data stream in a following manner: a cyclic prefix removal is performed on the demodulated first data stream to obtain a serial fifth data stream; the data receiving apparatus further includes a serial-to-parallel conversion module configured to convert a serial first data stream into a parallel first data stream; the signal demodulation module 152 is configured to sequentially perform the M-dimensional discrete Fourier transformation, the subcarrier de-mapping, and the equalization processing on the parallel fifth data stream to obtain a parallel fourth data stream.

In an embodiment, in the embodiment shown in FIG. 15, the orthogonal inverse transform module 153 is configured to perform the N-dimensional inverse orthogonal transformation on the fourth data stream to obtain the inverse orthogonally transformed first data stream in a following manner: the N-dimensional inverse orthogonal transformation is performed on the parallel fourth data stream to obtain a parallel and inverse orthogonally transformed first data stream; and the parallel and inverse orthogonally transformed first data stream is converted into a serial and inverse orthogonally transformed first data stream.

In an embodiment, in the embodiment shown in FIG. 15, the N-dimensional orthogonal transformation includes any one of: an N-dimensional discrete cosine transformation, an N-dimensional discrete Hartley transformation, or an N-dimensional Welch Hadamard transformation.

Figure 16:
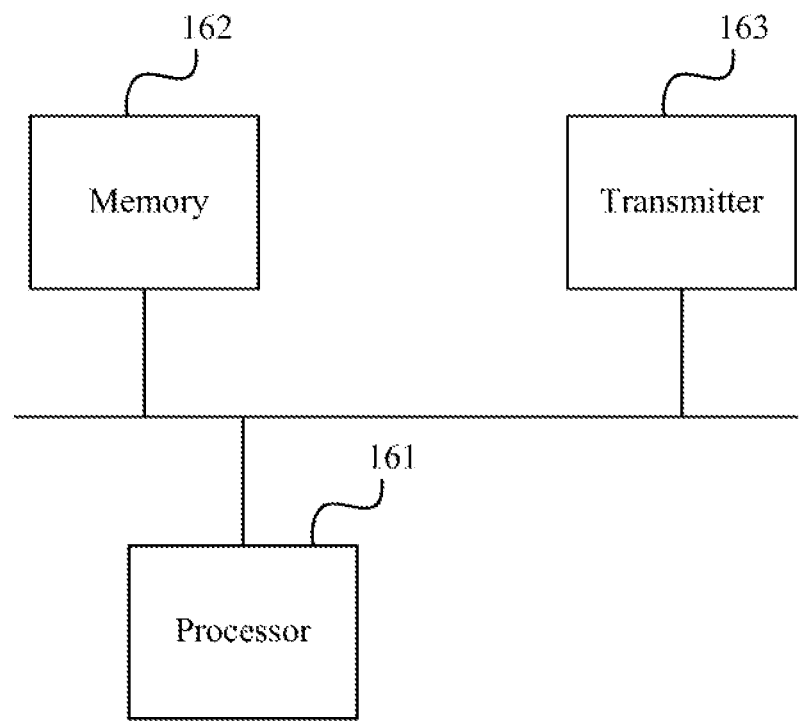
FIG. 16 is a schematic structural diagram of a terminal provided in an embodiment.

FIG. 16 is a schematic structural diagram of a terminal provided in an embodiment, as shown in FIG. 16, the terminal includes a processor 161, a memory 162, and a transmitter 163. The processor 161 in the terminal may include one or more processors, and one processor 161 is taken as an example in FIG. 16; and the processor 161 and the memory 162 in the terminal being connected by a bus is taken as an example in FIG. 16.

The memory 162, as a computer-readable storage medium, may be configured to store software programs, computer-executable programs, and modules, such as program instructions/modules corresponding to the data sending method in the embodiments of FIGS. 1 to 7 of the present application (such as, the data acquisition module 141, the orthogonal transformation module 142, the signal modulation module 143, and the signal sending module 143 in the data sending apparatus). The processor 161 executes the software programs, instructions and modules stored in the memory 162, so as to implement at least one functional application and data processing of the terminal, that is, the data sending method described above.

The memory 162 may mainly include a stored program region and a stored data region, where the stored program region may store an operating system, an application program required for at least one function; the storage data region may store data or the like which may be created in accordance with the use of the terminal. Moreover, the memory 162 may include a high-speed random access memory and may further include non-volatile memory, such as at least one magnetic disk storage device, a flash memory device, or other non-volatile solid-state memory device.

The transmitter 163 is a module or combination of devices capable of transmitting radio frequency signals into a space, including, for example, a combination of radio frequency transmitters, antennas, and other devices.

Figure 17:
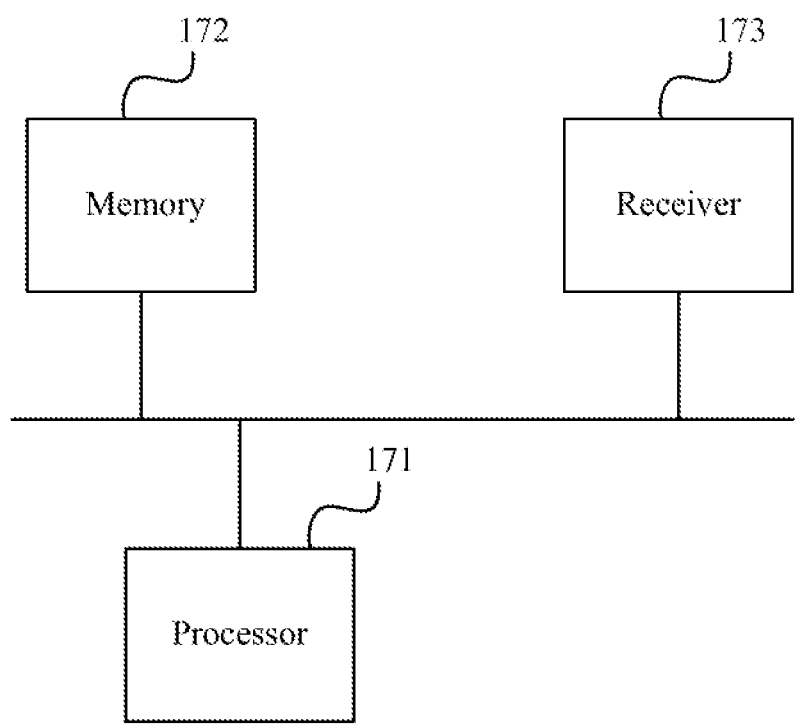
FIG. 17 is a schematic structural diagram of another terminal provided in an embodiment.

FIG. 17 is a schematic structural diagram of another terminal provided in an embodiment, and as shown in FIG. 17, the terminal includes a processor 171, a memory 172, and a receiver 173. The processor 171 in the terminal may include one or more processors, and one processor 171 is taken as an example in FIG. 17; the processor 171 and the memory 172 in the terminal may be connected by a bus or other means, and the processor 171 and the memory 172 in the terminal being connected by a bus is taken as an example in FIG. 17.

The memory 172, as a computer-readable storage medium, may be configured to store software programs, computer-executable programs, and modules, such as program instructions/modules corresponding to the data receiving methods in the embodiments of FIGS. 8 to 10 of the present application (such as, the signal receiving module 151, the signal demodulation module 152, the orthogonal inverse transformation module 153, and the data acquisition module 153 in the data receiving apparatus). The processor 171 executes the software programs, instructions and modules stored in the memory 172, so as to implement at least one functional application and data processing of the terminal, that is, the data receiving method described above.

The memory 172 may mainly include a stored program region and a stored data region, where the stored program region may store an operating system, an application program required for at least one function; the storage data region may store data or the like which may be created in accordance with the use of the terminal. Moreover, the memory 172 may include a high-speed random access memory and may further include non-volatile memory, such as at least one magnetic disk storage device, a flash memory device, or other non-volatile solid-state memory device.

The receiver 173 is a module or combination of devices capable of receiving radio frequency signals into a space, including, for example, a combination of radio frequency receivers, antennas, and other devices.

An embodiment of the present application further provides a storage medium containing a computer executable instruction, the computer executable instruction is configured to execute a data sending method when being executed by a computer processor, and the data sending method includes: a first data stream is acquired, where the first data stream includes multiple coded data symbols; an N-dimensional orthogonal transformation is performed on the first data stream to obtain an orthogonally transformed first data stream, where N≥2; a modulation processing is performed on the orthogonally transformed first data stream to obtain a first radio frequency signal; and the first radio frequency signal is sent.

An embodiment of the present application further provides a storage medium containing a computer executable instruction, the computer executable instruction is configured to execute a data receiving method when executed by a computer processor, and the data receiving method include: a first radio frequency signal is received, where the first radio frequency signal includes multiple data symbols subjected to an N-dimensional orthogonal transformation processing, and N≥2; a modulation processing is performed on the first radio frequency signal to obtain a demodulated first data stream; an N-dimensional inverse orthogonal transformation is performed on the demodulated first data stream to obtain an inverse orthogonally transformed first data stream; and the inverse orthogonally transformed first data stream is detected to obtain a first data stream.

The foregoing is merely exemplary embodiments of the present application and is not intended to limit the scope of protection of the present application.

Those skilled in the art will appreciate that the term "user terminal" encompasses any suitable type of wireless user device, such as a mobile telephone, a portable data processing apparatus, a portable web browser, or a vehicle-mounted mobile station.

In general, the various embodiments of the present application may be implemented in hardware or special purpose circuits, software, logic or any combination thereof. For example, some aspects may be implemented in hardware, while other aspects may be implemented in firmware or software which may be executed by a controller, a microprocessor or other computing apparatus, although the present application is not limited thereto.

The embodiments of the present application may be implemented by a data processor of a mobile apparatus executing computer program instructions, such as in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

The block diagrams of any logic flows in the drawings of the present application may represent program steps, or may represent interconnected logic circuits, modules, and functions, or may represent a combination of program steps and logic circuits, modules, and functions. A computer program may be stored on the memory. The memory may be of any type suitable to a local technical environment and may be implemented using any suitable data storage technology, such as, but not limited to, a read-only memory (ROM), a random-access memory (RAM), an optical storage device and system (digital versatile disk (DVD), or a compact disk (CD)). The computer-readable medium may include a non-transitory storage medium. The data processor may be of any type suitable to the local technical environment, such as, but not limited to, a general purpose computer, a special purpose computer, a microprocessor, a digital signal processor (DSP), an application specific integrated circuit (ASIC), a programmable logic device (FGPA), and a processor based on a multi-core processor architecture.

What is claimed is:

1. A data sending method, comprising:
acquiring a first data stream, wherein the first data stream comprises a plurality of coded data symbols;
performing an N-dimensional orthogonal transformation on the first data stream to obtain an orthogonally transformed first data stream, wherein N≥2;
performing a modulation processing on the orthogonally transformed first data stream to obtain a first radio frequency signal; and
sending the first radio frequency signal.

2. The method of claim 1, wherein performing the N-dimensional orthogonal transformation on the first data stream to obtain the orthogonally transformed first data stream comprises:
mapping each bit of data symbol in the first data stream into at least two bits of data symbols to obtain a sequence expanded first data stream, and performing the N-dimensional orthogonal transformation on the sequence expanded first data stream to obtain an expanded and orthogonally transformed first data stream; or, performing the N-dimensional orthogonal transformation on the first data stream to obtain the orthogonally transformed first data stream, and mapping each bit of data symbol in the orthogonally transformed first data stream into at least two bits of data symbols to obtain an expanded and orthogonally transformed first data stream.

3. The method of claim 2, wherein mapping the each bit of data symbol in the first data stream into the at least two bits of data symbols to obtain the sequence expanded first data stream comprises:

mapping the each bit of data symbol in the first data stream into the at least two bits of data symbols by using an expansion sequence in a preset expansion sequence group to obtain the sequence expanded first data stream;

wherein mapping the each bit of data symbol in the orthogonally transformed first data stream into the at least two bits of data symbols to obtain the expanded and orthogonally transformed first data stream comprises:

mapping the each bit of data symbol in the orthogonally transformed first data stream into the at least two bits of data symbols by using an expansion sequence in the preset expansion sequence group to obtain the expanded and orthogonally transformed first data stream;

wherein the preset expansion sequence group comprises at least two expansion sequences.

4. The method of claim 1, wherein the N-dimensional orthogonal transformation comprises one of: an N-dimensional discrete cosine transformation, an N-dimensional discrete Hartley transformation, or an N-dimensional Welch Hadamard transformation.

5. The method of claim 1, wherein performing the modulation processing on the orthogonally transformed first data stream to obtain the first radio frequency signal comprises:

sequentially performing a subcarrier mapping, an M-dimensional inverse discrete Fourier transformation, and a cyclic prefix addition on the orthogonally transformed first data stream to obtain a second data stream, wherein M≥2; and performing a digital-to-analog conversion and an up-conversion on the second data stream to obtain the first radio frequency signal.

6. The method of claim 5, wherein before performing the N-dimensional orthogonal transformation on the first data stream to obtain the orthogonally transformed first data stream, the method further comprises:

converting a serial first data stream into a parallel first data stream.

7. The method of claim 6, wherein performing the N-dimensional orthogonal transformation on the first data stream to obtain the orthogonally transformed first data stream comprises:

performing the N-dimensional orthogonal transformation on the parallel first data stream to obtain a parallel and orthogonally transformed first data stream;

wherein sequentially performing the subcarrier mapping, the M-dimensional inverse discrete Fourier transformation, and the cyclic prefix addition on the orthogonally transformed first data stream to obtain the second data stream comprises:

sequentially performing the subcarrier mapping and the M-dimensional inverse discrete Fourier transformation on the parallel and orthogonally transformed first data stream to obtain a parallel third data stream;

converting the parallel third data stream into a serial third data stream; and performing the cyclic prefix addition on the serial third data stream to obtain the second data stream.

8. A data receiving method, comprising:

receiving a first radio frequency signal, wherein the first radio frequency signal comprises a plurality of data symbols subjected to an N-dimensional orthogonal transformation, and N≥2;

performing a demodulation on the first radio frequency signal to obtain a demodulated first data stream;

performing an N-dimensional inverse orthogonal transformation on the demodulated first data stream to obtain an inverse orthogonally transformed first data stream; and detecting the inverse orthogonally transformed first data stream to obtain a first data stream.

9. The method of claim 8, wherein performing the N-dimensional inverse orthogonal transformation on the demodulated first data stream to obtain the inverse orthogonally transformed first data stream comprises:

performing an inverse mapping on each at least two bits of data symbols in the demodulated first data stream into one bit of data symbol to obtain a sequence de-expanded first data stream, and performing the N-dimensional inverse orthogonal transformation on the sequence de-expanded first data stream to obtain a de-expanded and inverse orthogonally transformed first data stream; or, performing the N-dimensional inverse orthogonal transformation on the demodulated first data stream to obtain the inverse orthogonally transformed first data stream, and performing an inverse mapping on each at least two bits of data symbols in the inverse orthogonally transformed first data stream into one bit of data symbol to obtain a de-expanded and inverse orthogonally transformed first data stream.

10. The method of claim 9, wherein performing the inverse mapping on the each at least two bits of data symbols in the demodulated first data stream into the one bit of data symbol to obtain the sequence de-expanded first data stream comprises:

performing an inverse mapping on each at least two bits of data symbols in the demodulated first data stream into one bit of data symbol in sequence by using each extension sequence in a preset extension sequence group until the sequence de-expanded first data stream is obtained, and determining an expansion sequence used in the first radio frequency signal according to the sequence de-expanded first data stream;

wherein performing the inverse mapping on the each at least two bits of data symbols in the inverse orthogonally transformed first data stream into the one bit of data symbol to obtain the de-expanded and inverse orthogonally transformed first data stream comprises:

performing an inverse mapping on each at least two bits of data symbols in the inverse orthogonally transformed first data stream into one bit of data symbol in sequence by using each extension sequence in the preset extension sequence group until the de-expanded and inverse orthogonally transformed first data stream is obtained, and determining an expansion sequence used in the first radio frequency signal according to the de-expanded and inverse orthogonally transformed first data stream;

wherein the preset expansion sequence group comprises at least two expansion sequences.

11. The method of claim 8, wherein the N-dimensional orthogonal transformation comprises one of: an N-dimensional discrete cosine transformation, an N-dimensional discrete Hartley transformation, or an N-dimensional Welch Hadamard transformation.

12. The method of claim 8, wherein performing the modulation processing on the first radio frequency signal to obtain the demodulated first data stream comprises:

performing a down-conversion and an analog-to-digital conversion on the first radio frequency signal to obtain the demodulated first data stream;

wherein performing the N-dimensional inverse orthogonal transformation on the demodulated first data stream to obtain the inverse orthogonally transformed first data stream comprises:

sequentially performing a cyclic prefix removal, an M-dimensional discrete Fourier transformation, a subcarrier de-mapping, and an equalization processing on the demodulated first data stream to obtain a fourth data stream, where M≥2; and performing the N-dimensional inverse orthogonal transformation on the fourth data stream to obtain the inverse orthogonally transformed first data stream.

13. The method of claim 12, wherein sequentially performing the cyclic prefix removal, the M-dimensional discrete Fourier transformation, the subcarrier de-mapping, and the equalization processing on the demodulated first data stream to obtain the fourth data stream comprises:

performing a cyclic prefix removal on the demodulated first data stream to obtain a serial fifth data stream; and converting the serial fifth data stream into a parallel fifth data stream, and sequentially performing the M-dimensional discrete Fourier transformation, the subcarrier de-mapping, and the equalization processing on the parallel fifth data stream to obtain a parallel fourth data stream.

14. The method of claim 13, wherein performing the N-dimensional inverse orthogonal transformation on the fourth data stream to obtain the inverse orthogonally transformed first data stream comprises:

performing the N-dimensional inverse orthogonal transformation on the parallel fourth data stream to obtain a parallel and inverse orthogonally transformed first data stream; and converting the parallel and inverse orthogonally transformed first data stream into a serial and inverse orthogonally transformed first data stream.

15. A data sending apparatus, comprising:

a processor and a memory storing processor-executable instructions which, when executed by the processor, are configured to:

acquire a first data stream, wherein the first data stream comprises a plurality of encoded data symbols;

perform an N-dimensional orthogonal transformation on the first data stream to obtain an orthogonally transformed first data stream, wherein N≥2;

perform a modulation processing on the orthogonally transformed first data stream to obtain a first radio frequency signal; and send the first radio frequency signal.

16. The apparatus of claim 15, wherein the processor-executable instructions, when executed by the processor, are further configured to: map each bit of data symbol in the first data stream into at least two bits of data symbols to obtain a sequence expanded first data stream, and perform the N-dimensional orthogonal transformation on the sequence expanded first data stream to obtain an expanded and orthogonally transformed first data stream; or, perform the N-dimensional orthogonal transformation on the first data stream to obtain the orthogonally transformed first data stream, and map each bit of data symbol in the orthogonally transformed first data stream into at least two bits of data symbols to obtain an expanded and orthogonally transformed first data stream.

17. A data receiving apparatus, comprising:

a processor and a memory storing processor-executable instructions which, when executed by the processor, are configured to perform the data receiving method of claim 8.

18. A data transmission system, comprising: a data sending terminal and a data receiving terminal; wherein, the data sending terminal comprises the data sending apparatus of claim 15; and the data receiving terminal comprises the data receiving apparatus of claim 17.

19. A storage medium, storing a computer program, wherein the computer program, when executed by a processor, implements the data sending method of claim 1.

20. A storage medium, storing a computer program, wherein the computer program, when executed by a processor, implements the data receiving method of any one of claim 8.

* * * * *